(12) United States Patent
Cho et al.

(10) Patent No.: US 8,392,722 B2
(45) Date of Patent: Mar. 5, 2013

(54) DIGITAL CABLE SYSTEM AND METHOD FOR PROTECTION OF SECURE MICRO PROGRAM

(75) Inventors: Yong Seong Cho, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1238 days.

(21) Appl. No.: 12/191,374

(22) Filed: Aug. 14, 2008

(65) Prior Publication Data
US 2009/0150974 A1 Jun. 11, 2009

(30) Foreign Application Priority Data
Dec. 5, 2007 (KR) .................. 10-2007-0125472

(51) Int. Cl.
*G06F 21/00* (2006.01)
(52) U.S. Cl. ............ 713/189; 713/187; 713/188; 726/2; 726/22; 726/26; 380/28; 725/31
(58) Field of Classification Search .................. 713/189, 713/187, 188; 726/2, 22, 26; 380/28; 725/31
See application file for complete search history.

(56) References Cited

U.S. PATENT DOCUMENTS

| 7,937,592 B2 * | 5/2011 | Li ................................. 713/189 |
| 2003/0174844 A1 * | 9/2003 | Candelore ..................... 380/277 |
| 2009/0141901 A1 * | 6/2009 | You et al. ..................... 380/277 |

FOREIGN PATENT DOCUMENTS

| JP | 2005-245010 A | 9/2005 |
| KR | 1020040083129 A | 10/2004 |
| KR | 1020070037782 | 4/2007 |

OTHER PUBLICATIONS

Grant of Patent by KIPO (The Korean Intellectual Property Office) for KR-10-2007-0125472, Feb. 22, 2010.*

* cited by examiner

*Primary Examiner* — April Shan
(74) *Attorney, Agent, or Firm* — Ladas & Parry LLP

(57) ABSTRACT

Provided is a digital cable system and method for protecting a secure micro (SM) client, and more particularly, a digital cable system and method for protecting an SM program that can improve the security of an SM program through authentication of a host and integrity verification of the SM program. A method of protecting an SM program includes: receiving host authentication information associated with a host from a trusted authority; verifying validity of the secure micro program based on the host authentication information; and sending, to an authentication proxy, a HostStateInformation message that includes host state information associated with validity verification information of the SM program.

14 Claims, 6 Drawing Sheets

DIGITAL CABLE SYSTEM AND METHOD FOR PROTECTION OF SECURE MICRO PROGRAM

CROSS-REFERENCE TO RELATED APPLICATION

This application claims priority from Korean Patent Application No. 10-2007-0125472, filed on Dec. 5, 2007, in the Korean Intellectual Property Offices the entire disclosure of which is incorporated herein by reference.

BACKGROUND OF THE INVENTION

1. Field of the Invention

The present invention relates to a digital cable system and method for protecting a secure micro (SM) client, and more particularly, to a digital cable system and method for protecting an SM program that can improve the security of an SM program through authentication of a host and integrity verification of the SM program.

This work was supported by the IT R&D program of MIC/IITA. [2007-S-007-01, The Development of Downloadable Conditional Access System]

2. Description of Related Art

A Conditional Access System (CAS) is a system that can insert codes to a paid broadcast program and thereby can assign only allowed subscribers with a right to view the paid broadcast program. Currently, in order to provide a paid broadcasting service, digital cable broadcasting generally uses a smart card or a cable card in a Personal Computer Memory Card International Association (PCMCIA) card type depending on an embodiment type of Conditional Access (CA) application. However, since the conventional CAS distributes CAS software or CAS client images offline using the smart card or the PCMCIA card, a predetermined period of time may be spent to reissue a card when a defect occurs in the CAS. Therefore, it may be difficult to quickly cope with the defect and the re-issuance of the card may cause additional costs.

In order to overcome the above problems, development of Downloadable Conditional Access System (DCAS) technology based on a bidirectional cable communication network currently becomes an issue. According to the conventional art, a CAS provider may install predetermined CAS software in the smart card or the PCMCIA card to thereby provide the paid broadcasting service. However, the DCAS technology may install a secure micro (SM) that can be installed with CAS software to thereby readily update an SM program via the bidirectional cable communication network when a defect occurs in the SM program including the CAS software, or when updating a version of the SM program.

If there is no guarantee for secure authorization of a subscriber, a high level of security with respect to a channel to send client software, and prevention of forgery and modulation of a host, for example, a subscriber set-top box, downloading of the SM program of the DCAS may bring serious damage, such as leakage of key technology of the SM program by malicious hacking, due to vulnerability of a wired software transmission scheme in an aspect of security.

SUMMARY OF THE INVENTION

An aspect of the present invention provides a system and method of protecting a secure micro (SM) program that can cut off malicious attacks against an SM installed in a host and an SM program embodied on the SM that are made from a Multiple System Operator (MSO) via a cable network, and thereby can protect the SM program for guaranteeing a safe security environment.

Another aspect of the present invention also provides a system and method of protecting an SM program that can improve the security of an SM program through authentication of a host and integrity verification of the SM program, based on an SM certificate stored in an SM.

According to an aspects of the present invention, there is provided a method of protecting an SM program, including: receiving host authentication information associated with a host from a trusted authority; verifying validity of the SM program based on the host authentication information; and sending, to an authentication proxy, a HostStateInformation message that includes host state information associated with validity verification information of the SM program.

According to another aspect of the present invention, there is provided a method of protecting an SM program, including: receiving, from a trusted authority, a ValidityCheck message that includes validity verification information associated with a host; authenticating the host based on the ValidityCheck message to generate a session key for secure message sending; and sending host authentication information corresponding to the validity verification information of the host to an SM to thereby receive, from the SM, host state information that includes the validity verification information of the SM program corresponding to the host authentication information.

According to still another aspect of the present invention, there is provided a system for protecting an SM program, including: a host to receive host authentication information from a trusted authority, verify validity of the SM program based on the host authentication information, and send, to an authentication proxy, a HostStateInformation message that includes host state information associated with validity verification information of the SM program; and an headend system to receive, from the trusted authority, a ValidityCheck message that includes validity verification information of the host and send, to an SM of the host, a HostAuthentication message that includes the host authentication information corresponding to the validity verification information of the host.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
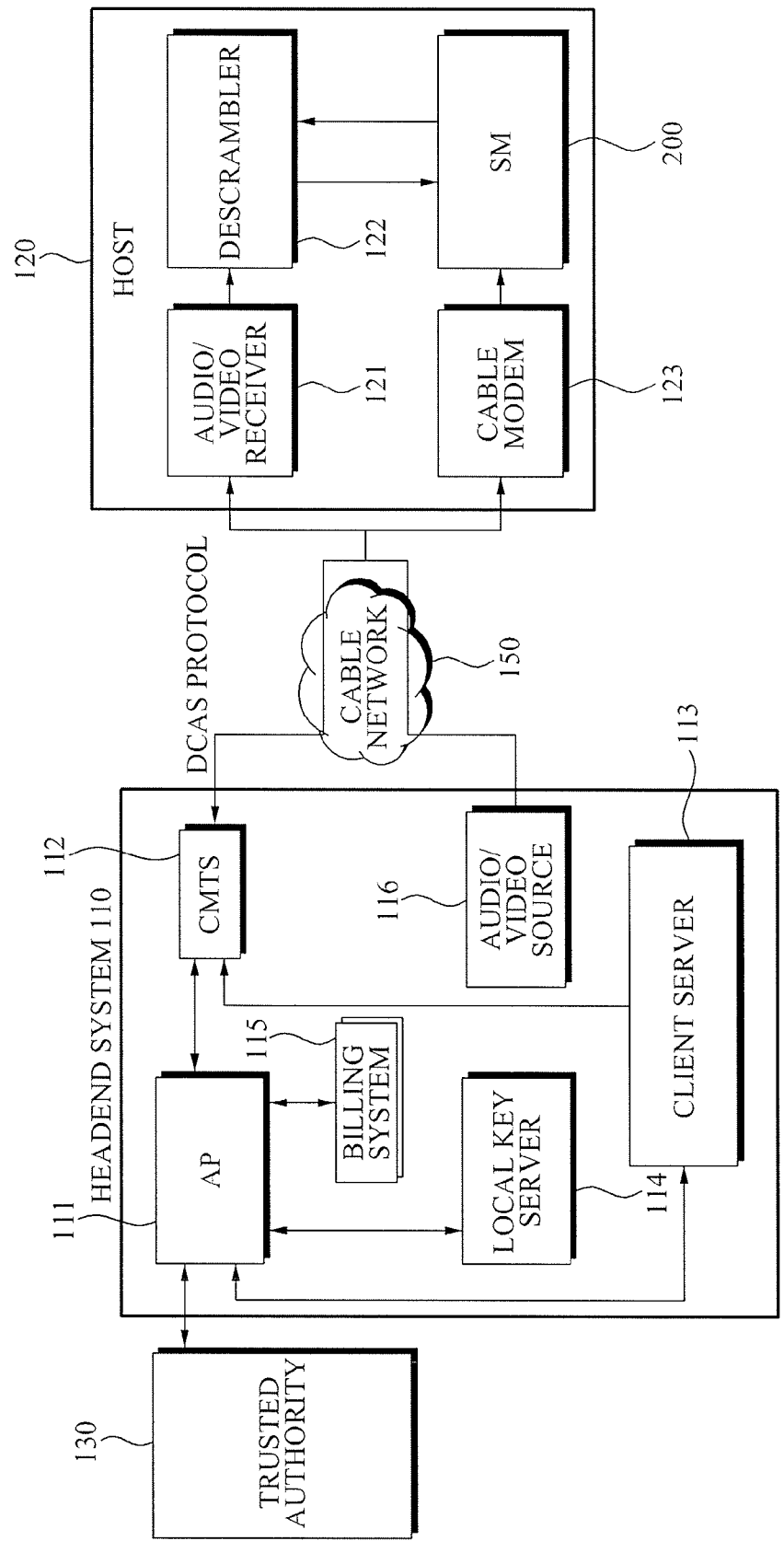
FIG. 1 is a block diagram illustrating a configuration of a system for protecting a secure micro (SM) program according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

The term "host" used herein denotes a host device such as a set-top box that can support a downloadable client in a secure micro (SM) according to a Downloadable Conditional Access System (DCAS) standard. The host may be defined to include Data-Over-Cable Service Interface Specifications (DOCSIS)/DOCSIS Set-Top Gateway (DSG) eCM, an SM driver, and a conditional access network handler in order to support the DCAS.

Also, the term "SM client" used herein may be defined to include an "Authorized Service Domain (ASD) client", a "CAS client", and a "Digital Rights Management (DRM) client".

Communication mechanism associated with a standard and a procedure regarding a message sent and received among a trusted authority, an authentication proxy (AP), and an SM is defined as a DCAS protocol.

FIG. 1 is a block diagram illustrating a configuration of a system for protecting an SM program according to an embodiment of the present invention.

Referring to FIG. 1, the SM program protecting system includes a headend system 110, a host 120, and a trusted authority 130.

The host 120 may receive host authentication information from the trusted authority 130, verify validity of the SM program based on the host authentication information, and send a HostStateInformation message to an AP 111 of the headend system 110. The HostStateInformation message may include host state information associated with validity verification information of the SM program. An SM 200 of the host 120 may use the third trusted authority 130 instead of a cable provider in order to manage information needed for authentication and the validity verification of the AP 111 of the headend system 110. Through this, the SM 200 may supply the host 120 with the improved SM program for protecting media technologies and videos in a Consumer Premise Equipment (CPE) (not shown).

The host 120 includes an audio/video receiver 121 to receive audio/video contents for broadcasting from the headend system 110, a descrambler 122 to descramble scrambled audio/video contents, and a cable modem 123 to send and receive additional broadcasting data that includes an SM program and a message associated with the DCAS protocol.

When the host 120 is powered on, the SM 200 may perform a host authentication process. When the host authentication process is normally completed, the SM 200 may verify host state information associated with the SM program that is stored in the SM 200. When the SM program needs to be downloaded, the SM 200 may request the AP 111 to download the SM program and may receive the SM program via the cable modem 123. The received SM program may be stored in the SM 200 to be executed.

The headend system 110 includes the AP 111. The AP 111 may receive, from the trusted authority 130, a ValidityCheck message that includes validity verification information of the host 120 and send, to a HostAuthentication message that includes host authentication information corresponding to the validity verification information of the host 120.

The AP 111 may receive information for generating a session key and the host authentication information from the trusted authority 130 and send the received information to the SM 200 via a Cable Modem Termination System (CMTS) 112. The session key may be needed for authentication. Also, all the key information that may be generated during a mutual authentication process may be managed in a local key server 114. When the mutual authentication, validity verification of the host 120, and validity verification of the SM program are normally completed, a client server 113 may send the SM program to the SM 200 via the CMTS 112.

Accordingly, the SM 200 may download or update the SM program and then may obtain a view allowance of a scrambled broadcasting signal and provide a subscriber with a paid broadcasting service via a CPE.

The trusted authority 130 may generate keys to be embedded in the SM 200 of the host 120, plan the keys, verify validity, and detect the validity. Specifically, the trusted authority 130 may perform stable communication with the AP 111 to thereby provide information associated with authentication and validity verification.

As described above the communication mechanism associated with the standard and the procedure regarding the message sent and received among the trusted authority 130, the AP 111 and the SM 200 is defined as the DCAS protocol. Security of the message sent and received among the trusted authority 130, the AP 111, and the SM 200, the mutual authentication, host validity verification, and validity verification of the SM program may be performed based on the DCAS protocol.

Figure 2:
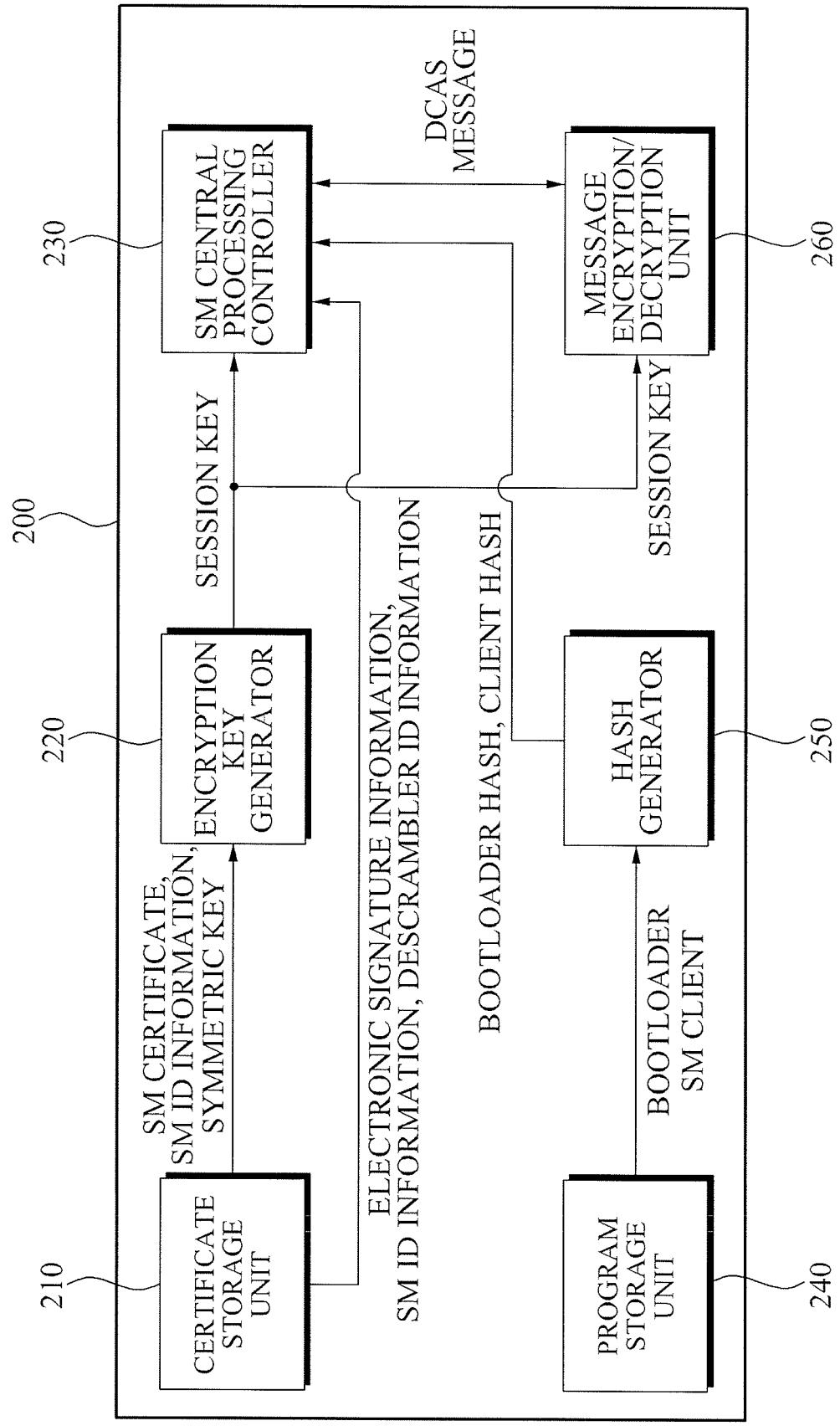
FIG. 2 is a block diagram illustrating a configuration of an SM included in a host of FIG. 1.

FIG. 2 is a block diagram illustrating a configuration of the SM 200 included in the host 120 of FIG. 1.

Referring to FIG. 2, the SM 200 includes a certificate storage unit 210, an encryption key generator 220, a program storage unit 240, a hash generator 250, and a message encryption/decryption unit 260.

The certificate storage unit 210 may store unique host information and an SM certificate issued from the trusted authority 130. The encryption key generator 220 may generate and manage an encryption key for security of a message that is communicated between the headend system 110 and the SM 200. The encryption key generator 220 may receive the unique host information such as the SM certificate, SM identification (ID) information, and a symmetric key from the certificate storage unit 210, and generate the encryption key to encrypt the unique host information.

The program storage unit 240 may store the SM program. The hash generator 250 may receive the SM program from the program storage unit 240 and generate hash value information for verifying integrity of the SM program. The SM program may include a bootloader and an SM client. The message encryption/decryption unit 260 may encrypt the message communicated with the headend system 110 and decrypt the encrypted message.

The SM 200 may further include an SM central processing controller 230 to control the above-described process.

Figure 3:
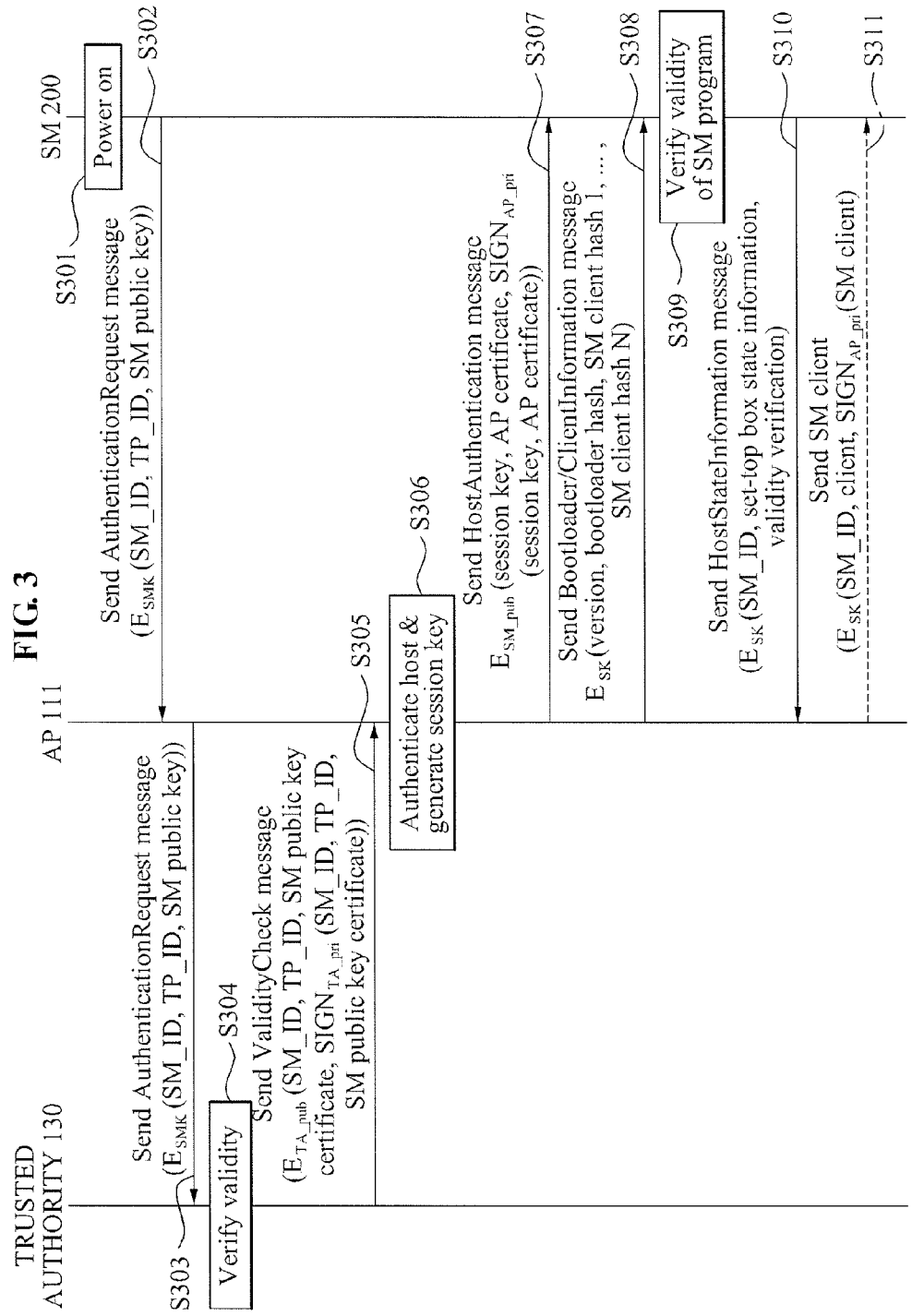
FIG. 3 is a flowchart illustrating a method of protecting an SM program among a trusted authority, an authentication proxy (AP), and an SM according to an embodiment of the present invention.

FIG. 3 is a flowchart illustrating a method of protecting an SM program among a trusted authority 130, an AP 111, and an SM 200 according to an embodiment of the present invention.

Referring to FIG. 3, a host supporting an SM program protecting system should be authenticated in order to normally view cable broadcasting. As necessary, the host should download an SM client from a headend system. The SM client may include a CAS client and a DRM client for paid broadcasting and prevention of illegal contents distribution.

For this, when the host is powered on in operation S301, the SM 200 may encrypt an AuthenticationRequest message, including unique host information, using a symmetric key and then send the AuthenticationRequest message to the trusted authority 130 via the AP 111 for authentication of the host in operations S302 and S303. The unique host information includes SM ID information SM_ID, descrambler ID information TP_ID, and SM public key information SM public key for mutual authentication.

The AP 111 may receive the AuthenticationRequest message from the SM 200 and send the AuthenticationRequest message to the trusted authority 130 in operation S303 in order to verify whether the received unique host information is issued by from the trusted authority 130.

In operation S304, the trusted authority 130 may verify validity of the host based on the received unique host information. When the validity is verified, the trusted authority 130 may send a ValidityCheck message that includes validity verification information in operation S305. The ValidityCheck message includes unique host information that includes SM_ID and TP_ID, SM public key information, SM certificate information, and electronic signature information associated with the unique host information, the SM public key information, or the SM certificate information.

The AP 111 that receives the ValidityCheck message may authenticate the host based on the ValidityCheck message and generate a session key for secure message sending in operation S306. Specifically, the AP 111 may compare the unique host information included in the ValidityCheck message with unique host information stored in the AP 111 to thereby authenticate the host. Also, the AP 111 may form a session for message exchanging based on DCAS protocol and may generate a session key for secure message sending. The generated session key may be sent to the SM 200 together with an AP certificate and an electronic signature.

In operation S307, the AP 111 may send host authentication information corresponding to the validity verification information of the host to the SM 200. Specifically, the AP Ill may send a HostAuthentication message that includes session key information associated with the session key that is generated by the AP 111 for secure message sending, certificate information associated with a certificate that is issued from the AP 111, and electronic signature information associated with the session key and the AP certificate.

In operation S308, the AP 111 may send a Bootloader/ClientInformation message corresponding to the SM program information to the SM 200 so that the SM 200 may verify whether the SM program is forged or modulated and thereby may verify validity of the SM program. The SM program may include a bootloader to check integrity of an SM client when booting the SM client and the host. The Bootloader/ClientInformation message may include bootloader version information, SM client version information, bootloader hash value information associated with the bootloader, and SM client hash value information associated with the SM client. Since the SM client includes at least one client, the SM client hash value information may include hash value information corresponding to a number of included SM clients. Hereinafter, a structure of the Bootloader/ClientInformation message according to an embodiment of the present invention will be described with reference to FIG. 4.

Figure 4:
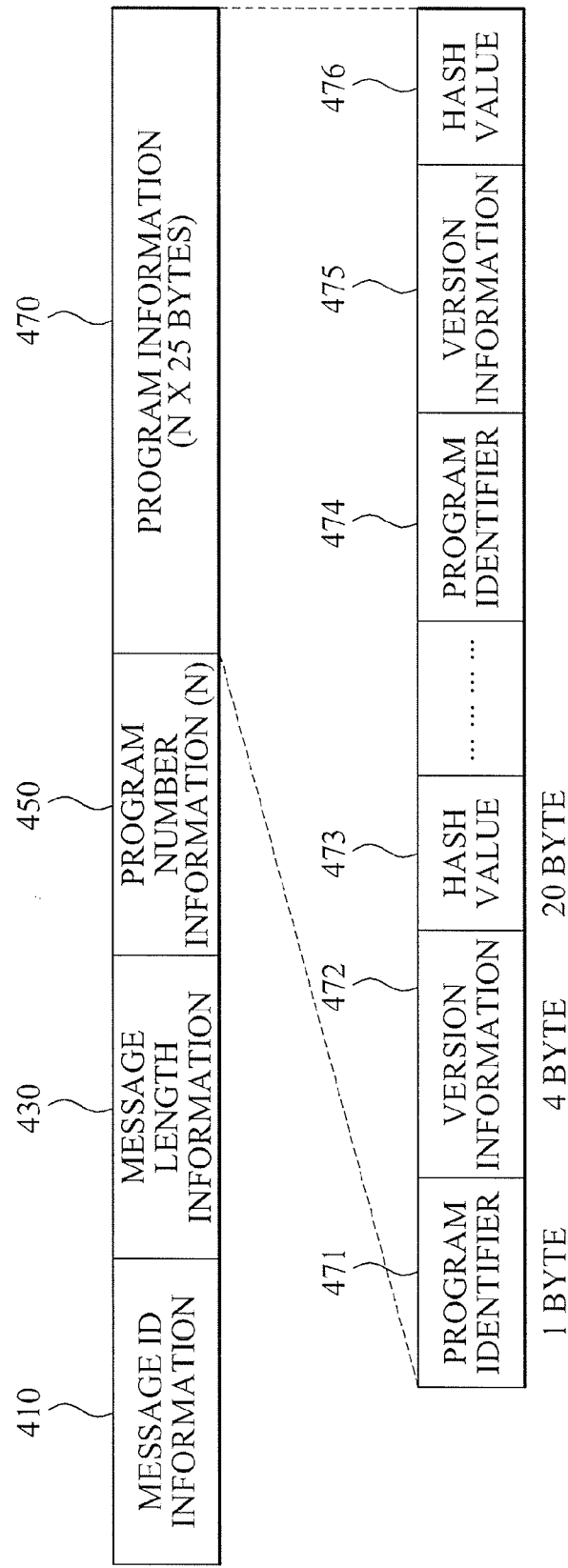
FIG. 4 illustrates a structure of a Bootloader/ClientInformation message that is sent from an AP to an SM to verify integrity of an SM program according to an embodiment of the present invention.

FIG. 4 illustrates a structure of a Bootloader/ClientInformation message that is sent from an AP to an SM to verify integrity of an SM program according to an embodiment of the present invention.

Referring to FIG. 4, after completing the authentication of the host, the AP 111 may send the Bootloader/ClientInformation message to the SM 200. The Bootloader/ClientInformation message may include version information associated with SM programs such as bootloader version information and SM client version information, bootloader hash value information associated with the bootloader, and SM client hash value information associated with the SM client.

The Bootloader/ClientInformation message may include message ID information 410 to identify types of messages being communicated between the AP 111 and the SM 200, message length information 430, program number information 450 associated with a number of SM programs operated in the SM 200, and program information 470 that includes the SM program version information and a program code hash value.

The program information 470 may include program identifiers 471 and 474 for identifying the SM programs, version information 472 and 475, and hash values 473 and 473 that are obtained by calculating a corresponding program code according to a predetermined hash algorithm. The field length of the program information 470 may be expressed by multiplying a number of programs N and information associated with the SM program that can be operated in the SM 200.

Referring again to FIG. 3, in operation S309, the SM 200 may verify validity of the SM program based on the Bootloader/ClientInformation message and a HostAuthentication message that includes the host authentication information. Specifically, the SM 200 may compare the bootloader hash value information and the secure micro client hash value information, included in the Bootloader/ClientInformation message, with a hash value that is generated by a hash value generator of the SM 200. The SM 200 may determine whether the SM program is forged based on the comparison result and thereby generate validity verification information of the SM program.

In operation S310, the SM 200 may send, to the AP 111, a HostStateInformation message that includes host state information associated with validity verification information of the SM program. The host state information may include the SM identification information SM_ID and validity verification information. Hereinafter, the structure of the HostStateInformation message according to an embodiment of the present invention will be described with reference to FIG. 5.

Figure 5:
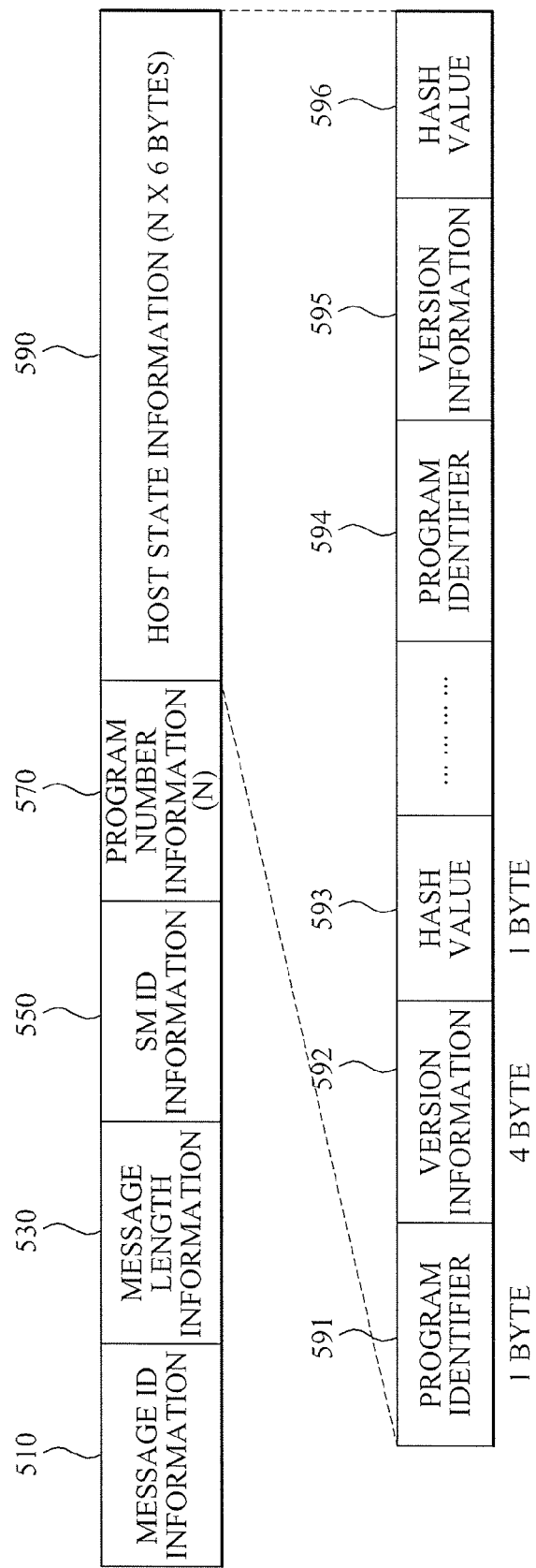
FIG. 5 illustrates a structure of a HostStateInformation message that is sent from an SM to an AP in association with a validity verification information of integrity result of an SM program according to an embodiment of the present invention.

FIG. 5 illustrates a structure of a HostStateInformation message that is sent from an SM to an AP in association with a validity verification information of integrity result of an SM program according to an embodiment of the present invention.

Referring to FIG. 5, the HostStateInformation message may include message ID information to identify the HostStateInformation message, message length information 530, SM ID information 550, program number information 570 associated with a number of SM programs included in the SM 200, and host state information 590 to compare SM program hash value information received from the AP 111 with a hash value generated from a program code stored in the SM 200 and to inform the AP 111 of the comparison result.

The host state information 590 may include program identifiers 591 and 594 for identifying the SM programs, version information 592 and 595 associated with versions of the SM programs, and SM program hash values 593 and 596.

When the host is in a normal state based on the SM program hash values 593 and 596, the AP 111 may enable normal receiving of a broadcasting service and send the SM client to a host that is not installed with the SM program. Also, when hash values of SM programs are different from each other, the AP may suspend a service with respect to a corresponding host and enable a normal operation through download of the SM program or another method.

Referring again to FIG. 3, the AP 111 that receives the HostStateInformation message may verify whether the SM programs stored in the host are secure based on the host state information and provide a subscriber with a normal broadcasting service. The HostStateInformation message includes download information regarding whether the host needs to download the SM client. Therefore, the AP 111 may send the SM client corresponding to the download information to the SM 200 in operation S311. In this case, the AP 111 may send an encrypted message to the SM 200. The encrypted message may include the SM ID information, the SM client, and electronic signature information associated with the SM client.

A process of protecting the SM program that is executed in the SM 200 may include operations of receiving host authentication information of the host from the trusted authority 130, verifying the validity of the SM program based on the received host authentication information, and sending, to the SM server 111, a HostStateInformation message that includes host state information associated with validity verification information of the SM program. When host authentication information of the host is received from the trusted authority 130, the AuthenticationRequest message including unique host information may be sent to the trusted authority 130 prior to receiving of the host authentication information. The HostAuthentication message that includes the host authentication information in the authentication result may be received from the AP 111. Also, as described above, the AuthenticationRequest message may be encrypted using a symmetric key and be sent to the trusted authority 130 via the AP 111.

Also, when the Bootloader/ClientInformation message corresponding to the SM program information is received from the AP 111, the SM 200 may compare bootloader hash value information and SM client hash value information with the hash value generated by the hash generator of the SM, determine whether the SM program is forged based on the comparison result, and thereby generate validity verification information of the SM program. Hereinafter, a validity verification process with respect to validity of an SM program that is executed in an SM module will be described in detail with reference to FIG. 6.

Figure 6:
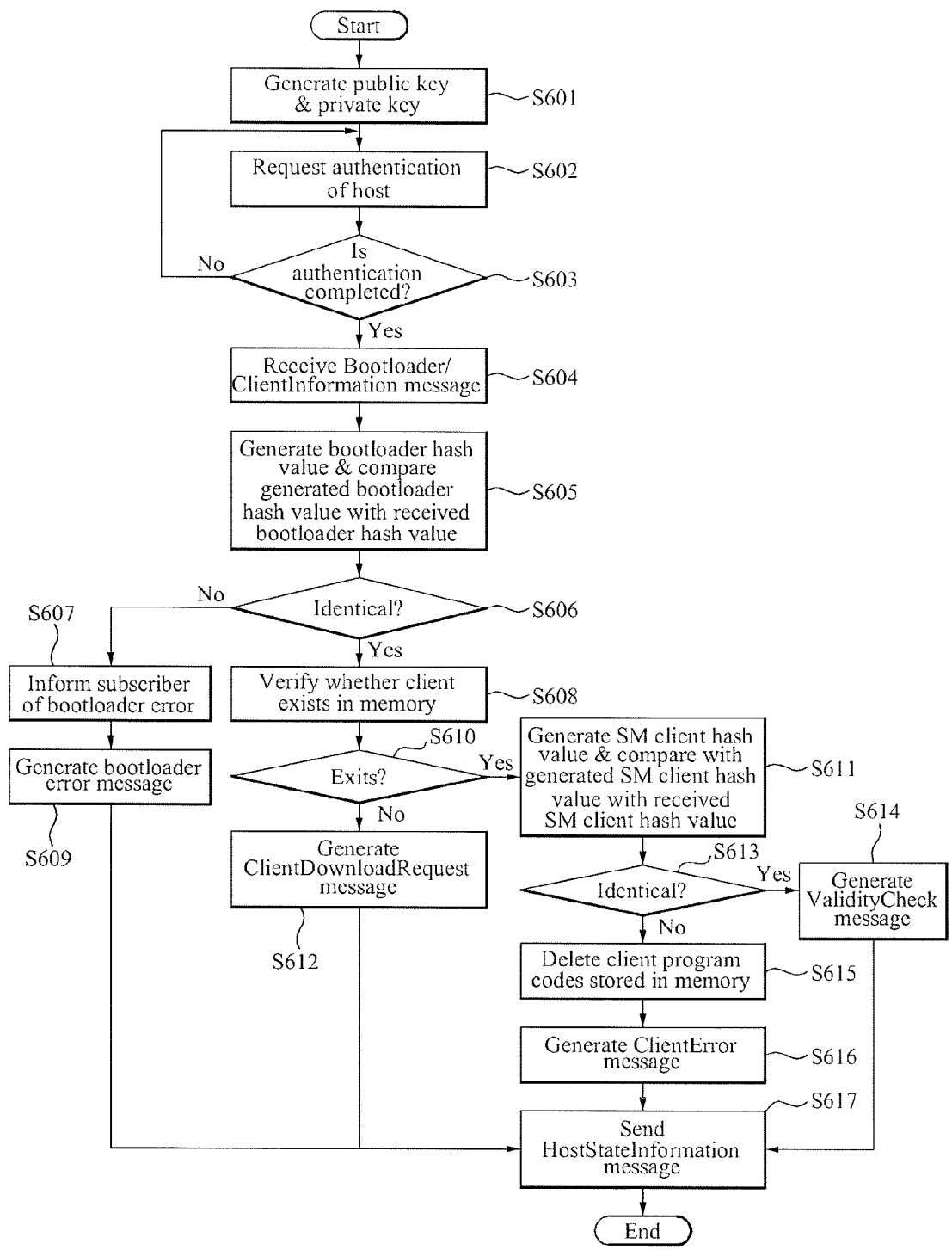
FIG. 6 is a flowchart illustrating a process of describing validity verification of integrity of an SM program that is executed in an SM according to an embodiment of the present invention.

FIG. 6 is a flowchart illustrating a process of describing validity verification of integrity of an SM program that is executed in an SM according to an embodiment of the present invention.

Referring to FIG. 6, when a host is powered on, the SM may generate a public key and a private key for authentication between a host and an AP of a headend system in operation S601. In operation S602, unique host information may be sent to the AP for authentication of the host. The unique host information may include a generated key value, SM ID information stored in a manufacturing process of a set-top box, and descrambler ID information.

When the authentication is successfully completed in operation S603, the SM may receive validity verification information such as a session key for encryption communication and a certificate, from the AP and may receive a Bootloader/ClientInformation message associated with an SM client and a bootloader from the AP in operation S604.

The received Bootloader/ClientInformation message may include bootloader version information, SM program version information, and hash value information of SM programs. The information may be used for comparison with information associated with the SM programs that are stored in the SM to thereby verify validity of a corresponding SM program regarding whether the SM program is arbitrarily modified or changed.

Specifically, for the integrity verification of the SM program, the SM may generate a bootloader hash value of the bootloader stored in the SM and compare the generated bootloader hash value with the received bootloader hash value in operation S605.

In operation S606, it is determined whether the hash values are identical to each other based on the comparison result. When the hash values are identical to each other, the SM may verify that an SM client received via the AP in the previous process exists in a memory in operation S608. Conversely, when the hash values are different from each other, a corresponding bootloader error and action information corresponding to the bootloader error may be informed of a subscriber in operation S607. A bootloader error message may be generated in operation S607 and a HostStateInformation message may be generated in operation S617. Through this, the bootloader error may be informed to the AP.

When the SM client downloaded from the AP in the previous process does not exist in the memory, for example, a program storage unit, of the SM in operation S610, the SM may generate a ClientDownloadRequest message associated with download information to request sending of the SM client in operation S612 and send the HostStateInformation message including the ClientDownloadRequest message to the AP in operation S617. The ClientDownloadRequest message may be a different type of the above-described HostStateInformation message.

Conversely, when the SM client exists in the memory in operation S608, the SM may generate an SM client hash value of the SM client stored in the memory, for example, the program storage unit and compare the generated SM client hash value with an SM client hash value received from the AP in operation S611.

When the hash values are identical in operation S613, that is, when the SM client hash value generated from the SM is the same as the SM client hash value received from the AP, SM clients stored in the SM may be regarded as normal and thus the SM may generate a ValidityCheck message in operation S614. The SM may include the ValidityCheck message in the HostStateInformation message and then send the HostStateInformation message to the AP in operation S617.

Conversely, when the hash values are different from each other in operation S613, the SM client program stored in the SM may be regarded as abnormal. In operation S615, the SM may delete all the SM client program codes stored in the memory, for example, the program storage unit. In operation S616, the SM may generate a ClientError message in operation S616. The SM may include the ClientError message in the HostStateInformation message and then send the Host- StateInformation message in operation S617. Through a re-authentication process of the AP, the SM client may be downloaded again.

The SM program protecting method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a system and method of protecting an SM program that can cut off malicious attacks against an SM installed in a host and an SM program embodied on the SM that are made from a Multiple System Operator (MSO) via a cable network, and thereby can protect the SM program for guaranteeing a safe security environment.

Also, according to the present invention, there is provided a system and method of protecting an SM program that can improve the security of an SM program through authentication of a host and integrity verification of the SM program, based on an SM certificate stored in an SM.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of protecting a secure micro program, comprising:
   receive host authentication information from a trusted authority,
   verify, by a hardware processor, validity of the secure micro program based on the host authentication information, and send, to an authentication proxy, a HostStateInformation message that comprises host state information associated with the validity verification of the secure micro program based on the host authentication information;
   receive, from the trusted authority, a ValidityCheck message that comprises the host information associated with the validity verification of the secure micro program based on the host authentication information and send, to a secure micro of the host, a HostAuthentication message that comprises the host authentication information corresponding to the host information associated with the validity verification of the secure micro program based on the host authentication information.

2. The method of claim 1, wherein the receiving of the host authentication information comprises:
   sending, to the authentication proxy, an AuthenticationRequest message that comprises unique host information; and
   receiving, from the authentication proxy, a HostAuthentication message that comprises the host authentication information in an authentication result of the host.

3. The method of claim 2, wherein the unique host information comprises secure micro identification information, descrambler identification information, and secure micro public key information associated with mutual authentication.

4. The method of claim 2, wherein the AuthenticationRequest message is encrypted using a symmetric key and is sent to the trusted authority via the authentication proxy.

5. The method of claim 2, wherein the HostAuthentication message comprises session key information associated with a shared session key that is generated by the authentication proxy for secure message sending, certificate information associated with a certificate that is issued from the authentication proxy, and electronic signature information associated with the shared session key and the certificate.

6. The method of claim 1, wherein the secure micro program comprises a bootloader to check integrity of a secure micro client when booting the secure micro client and the host, and
   the verifying of the validity comprises:
   receiving a Bootloader/ClientInformation message corresponding to validity verification of the secure micro program based on the host authentication information from the authentication proxy.

7. The method of claim 6, wherein the Bootloader/ClientInformation message comprises bootloader version information, secure micro client version information, bootloader hash value information associated with the bootloader, and secure micro client hash value information associated with the secure micro client.

8. The method of claim 7, wherein the receiving of the Bootloader/ClientInformation message comprises:
   comparing the bootloader hash value information and the secure micro client hash value information with a hash value that is generated by a hash generator of a secure micro; and
   determining whether the secure micro program is forged based on the comparison result to thereby generate validity verification of the secure micro program based on the host authentication information.

9. The method of claim 1, wherein the host state information comprises secure micro identification information and the validity verification of the secure micro program based on the host authentication information.

10. The method of claim 1, wherein the HostStateInformation message comprises information associated with downloading of the secure micro client, and
   the sending of the HostStateInformation message comprises:
   receiving a secure micro client corresponding to the information associated with downloading of the secure micro client from the authentication proxy.

11. The method of claim 10, wherein the receiving of the secure micro client comprises:
   receiving, from the authentication proxy, an encrypted message that comprises secure micro identification information, the secure micro client, and electronic signature information associated with the secure micro client.

12. A system for protecting a secure micro program, comprising:

a hardware processor and a memory;

a host to receive host authentication information from a trusted authority, verify validity of the secure micro program based on the host authentication information, and send, to an authentication proxy, a HostStateInformation message that comprises host state information associated with the validity verification of the secure micro program based on the host authentication information; and a headend system to receive, from the trusted authority, a ValidityCheck message that comprises the host information associated with the validity verification of the secure micro program based on the host authentication information and send, to a secure micro of the host, a HostAuthentication message that comprises the host authentication information corresponding to the host information associated with the validity verification of the secure micro program based on the host authentication information.

13. The system of claim 12, wherein the ValidityCheck message further comprises:

unique host information, authentication proxy public key information, authentication proxy certificate information, and electronic signature information associated with the unique host information, the authentication proxy public key information, or the authentication proxy certificate information.

14. The system of claim 12, wherein the secure micro comprises:

a certificate storage unit to store unique host information and a secure micro certificate issued from the trusted authority;

an encryption key hardware generator to generate and manage an encryption key for security of a message that is communicated between the secure micro and the headend system;

a program storage unit to store the secure micro program;

a hash hardware generator to generate hash value information for integrity verification of the secure micro program; and a message encryption and decryption hardware unit to encrypt the message and decrypt the encrypted message.

* * * * *